United States Patent [19]

Blount

[11] Patent Number: 5,268,393

[45] Date of Patent: Dec. 7, 1993

[54] FLAME-RETARDANT POLYURETHANE FOAM PRODUCED WITHOUT ADDITIONAL BLOWING AGENTS

[76] Inventor: David H. Blount, 6728 Del Cerro Blvd., San Diego, Calif. 92120

[21] Appl. No.: 920,194

[22] Filed: Jul. 17, 1992

[51] Int. Cl.$^5$ .................................. C08J 9/04
[52] U.S. Cl. ...................... 521/85; 521/103; 521/106; 521/107; 521/123; 521/126; 521/127; 521/155; 521/154; 252/609
[58] Field of Search ............... 521/85, 103, 106, 107, 521/123, 126, 127, 155, 159; 252/609

[56] References Cited

U.S. PATENT DOCUMENTS

| | | | |
|---|---|---|---|
| 4,291,129 | 9/1981 | Kennedy | 521/103 |
| 4,374,207 | 2/1983 | Stone et al. | 521/123 |
| 4,755,547 | 7/1988 | Pawloski | 521/85 |
| 4,831,062 | 5/1989 | von Bonin | 521/103 |
| 5,110,840 | 5/1992 | Blount | 521/106 |

*Primary Examiner*—Maurice J. Welsh
*Assistant Examiner*—John M. Cooney, Jr.

[57] ABSTRACT

Flame-retardant polyurethane foam products are produced by mixing and reacting an organic phosphorus containing compound which will react with a polyisocyanate compound and produce a gaseous compound and a polyisocyanate compound in the presence of a polyurethane catalyst. No other blowing agent is necessary.

The flame-retardant polyurethane foam products may be used for thermal and sound-insulation, for cushioning, for molding useful objects and as a cavity filler.

12 Claims, No Drawings

FLAME-RETARDANT POLYURETHANE FOAM PRODUCED WITHOUT ADDITIONAL BLOWING AGENTS

BACKGROUND OF THE INVENTION

This invention relates to a process for the production of flame-retardant polyurethane foams wherein the blowing agent is produced by the chemical reaction of the flame-retardant compound with the polyisocyanate compound thereby producing a stable foam. No additional blowing agents are necessary.

The production of polyurethane products is well known in the Arts and many types of flame-retardant chemicals have been used in the process. The novel part of this invention is the utilization of the blowing agent produced by the reaction of the flame-retardant agent with the polyisocyanate compound to produce the foamed polyurethane products. It is not necessary to add another blowing agent such as freon-in order to produce a stable foamed product. The elimination of the need to use halogenated blowing agents in polyurethane foams will be beneficial to mankind. In the process of this invention, low cost and readily available compounds are utilized and there is an improvement in the cost of the product because expensive blowing agents are not needed.

While not wishing to be bound by any theory of operation, it appears that carbon dioxide and/or a gaseous alkyl compound is produced in the reaction and carbon dioxide is probably released from the polyisocyanate when it reacts with an organic phosphorus containing compound. The organic phosphorus containing compound also acts as the flame-retardant agent. The reaction between polyisocyanate and the organic phosphorus containing compound is enhanced by the addition of a polyurethane catalyst, especially the organic tin catalyst. In this reaction the gaseous compound is produced at a rate wherein the reacting components expand at a normal rate and solidifies at the end of the expansion to produce a flame-retardant polyurethane foamed product which may contain open and/or closed cells.

SUMMARY OF THE INVENTION

Accordingly the present invention process for the production of flame-retardant polyurethane foamed products, in which a first component, an organic phosphorus containing compound, is admixed with a second component, a polyisocyanate compound then electively a polyurethane catalyst is admixed. The mixture begins to foam and rises at the usual rate of time then solidifies into a stable foamed product. An organic compound with one or more active hydrogens that will react with a polyisocyanate compound may be added to the first or second component.

Other flame-retardant agents known in the Arts may also be added to the components. The flame-retardant polyurethane foamed produced by reacting an organic phosphorus containing compound with an organic polyisocyanate may be improved by the addition of foam stabilizers, polyurethane catalyst and a compound that has one or more active hydrogens that will react with a polyisocyanate compound, to the reaction mixture.

Flame-retardant polyurethane prepolymers may be produced by using an excess amount of an organic polyisocyanate to react with the organic phosphorus containing compound and let the gas produced escape leaving a liquid prepolymer which may be reacted with compounds that have one or more active hydrogen that will react with isocyanate radicals.

DETAILED DESCRIPTION

The preferred method to produce the flame-retardant polyurethane foam of this invention is to mix the polyurethane catalyst with the organic phosphorus containing compound then admix the polyurethane compound. The components may be mixed simultaneously or in any suitable order. The chemical reactions of this invention usually take place at ambient temperature and pressure, but in certain reactions between the components it may be necessary to lower or elevate the temperature and raise or lower the pressure. The chemical reactions between components may take place within a few seconds or may take 6–12 hours.

Flame-retardant polyurethane foamed products may be produced by admixing the following components:

A. An organic phosphorus containing compound that will react with a polyisocyanate compound and a gaseous product is produced;
B. A polyisocyanate compound;
C. A polyisocyanate catalyst;
D. A compound that contains at least one active hydrogen that will react with an isocyanate radical.

COMPONENT A

Any suitable organic phosphorus containing compound that will react with a polyisocyanate compound and a gas is produced by this reaction may be utilized in this invention. Suitable phosphorus containing organic compounds include, but are not limited to dialkyl phosphites, trialkyl phosphites, trialkyl phosphates, dialkyl alkylphosphonates, halogenated organic phosphate-phosphite compound, organic acid phosphates, organic phosphite-phosphate compound, organic phosphorate phosphoric acid, salts of organic phosphate-organic phosphates and mixtures thereof. The dialkyl alkylphosphonates, $R-P(O)(OR)_2$ wherein R is an alkyl radical, are the preferred phosphorus containing organic compound. Dimethyl methyl phosphonate is the preferred dialkyl alkylphosphonate. Organic and inorganic salts of the listed phosphorus containing organic compounds may also be utilized, preferably amino salts of the listed phosphorus containing organic compounds. Suitable compounds may contain both a phosphate radical and a phosphite radical.

Suitable dialkyl phosphites, $(RO)_2P(O)H$, wherein R is an alkyl radical, are, but not limited to, dimethyl phosphite, diethyl phosphite, diisopropyl phosphite, dibutyl phosphite and other dialkyl phosphites. Dialkyl phosphites that has undergone hydrolyses and/or salt forming may also be utilized in this invention.

Suitable trialkyl phosphites, $(RO)_3P$, wherein R is an alkyl radical, are, but not limited to, trimethyl phosphite, triethyl phosphite, tris(2-chloroethyl) phosphite, triisopropyl phosphite and other trialkyl phosphites. Trialkyl phosphites that has undergone hydrolysis and/or salt forming may also be utilized in this invention and are preferred.

Suitable trialkyl phosphates, $(RO)_3PO$ wherein R is an alkyl radical, are, but not limited to tributyl phosphate, tributoxyethyl phosphate and other trialkyl phosphates. The salts of trialkyl phosphates and its hydrolyzed compound may also be utilized in this invention.

Suitable organic phosphite-phosphate compounds, organic phosphate-phosphoric acid compounds and organic-phosphate compound may be produced by reacting organic phosphorus containing compounds such as organic phosphonates, organic phosphites, organic phosphate, and mixtures thereof with phosphorus acid compounds such as phosphoric acid, polyphosphoric acid, phosphinic acid, phosphinous acid, phosphine oxide, chlorophosphines, phosphorus oxychloride hypophosphorus acid, phosphorus halides and mixtures thereof. Aryl sulfonic acid may also be reacted with the organic phosphorus containing compounds.

These organic phosphate-phosphoric acid compounds and organic phosphite-phosphoric acid compounds will react with inorganic and organic compounds to produce salts of organic phosphate-phosphoric acid and organic phosphite-organic phosphate compound. These compounds may contain halogen atoms.

These organic phosphite-phosphoric acid compounds and organic phosphorate-phosphoric acid compounds will react with basic salt forming compound such as compounds containing alkali metal atoms, alkaline earth metal radicals, metal x radicals, ammonia, compounds containing ammonia radical, amines, amino compounds and mixtures thereof.

These organic phosphite-phosphoric acid compounds and organic phosphate-phosphoric acid will react with organic compound such as epichlorohydrin, epoxides, polyepoxides, alcohols, polyalcohols, halogenate alcohols and epoxides, aryl sulfonic acid and mixtures thereof to produce organic phosphorite-organic phosphate compounds and organic phosphate-organic phosphates compounds.

Any suitable halogenated phosphate-phosphites and their acid halides and acids as listed in U.S. Pat. No. 4,755,547, and is incorporated herein by reference, which will react with a polyisocyanate compound and produce gaseous compound may be utilized in this invention.

COMPONENT B

Any suitable organic compound containing at least 2 isocyanate radicals may be used in this invention. Suitable organic polyisocyanates may be aliphatic, cycloaliphatic, araliphatic, aromatic and heterocyclic polyisocyanates are well known in the arts. Suitable polyisocyanates which may be employed in the process of the invention are exemplified by the organic diisocyanate which are compounds of the general formula:

wherein R is a divalent organic radical such as an alkylene, aralkylene or arylene radical. Such radicals may contain, for example 2 to 20 carbon atoms. Other polyisocyanates, polyisothioryanates, fatty diisocyanates, and their derivatives may be equally employed. Inorganic and silicon polyisocyanate are also suitable according to the invention. Examples of useful polyisocyanate may be found listed in U.S. Pat. No. 4,296,211, page 4–6, in High Polymers, Volume XVI, "Polyurethane Chemistry and Technology", published by Saunders-Frisch Interscience Publishers, New York, London, Volume I, 1962, pages 32 to 42 and pages 44 to 54, and Volume II, 1964, pages 5 and 16 and pages 198 and 199 and are incorporated herein by reference.

It's generally preferred to use commercially readily available polyisocyanate, e.g., tolylene-2,4 and -2,6 diisocyanates and any mixtures of these isomers ("TDI"), Polyphenyl-polymethylene-isocyanates obtained by aniline-formaldehyde condensation followed by phosgenation and modified polyisocyanates. The preferred compound with at least two isocyanate radicals are polyphenyl-polymethylene-isocyanates obtained by aniline-formaldehyde condensation followed by phosgenation.

Any suitable compound which contains 1 or more isocyanate radicals and one or more unsaturated bonds which will polymerize may be used in this Invention. The unsaturated oliphatic isocyanates which has double-bond vinyl functionality in the same molecule are preferred. Hydroxyethyl methacrylate may be reacted with tolylene diisocyanate or with NCO-terminated prepolymer to produce compound with vinyl functionality and isocyanate functionality in the same molecule. The double-bond vinyl radical may be cured with free-radical initiators such as an organic hydroperoxide. The isocyanate radical may be cured and foamed with a compound containing attached water.

COMPONENT C

Catalysts which promote the reaction of isocyanates with reactive hydrogen are also often used according to the invention in catalytic amounts. Catalysts known per se may be used, e.g., tertiary amines such as triethylamine, tributylamine, N-methyl-morpho-line, N-ethyl-morphonine, N-coco-morpholine, N,N,N', N'-tetramethylethylene diamine, 1,4-diaza-bicyclo(2,2,2)-octane, N-methyl-N'-dimethylaminoethyl piperazine, N,N-dimethyl benzylamine, bis-(N,N-diethylaminoethyl)-adipate, N,N-dimethyl cyclohexylamine, N,N,N', N'-tetramethyl-1,3-butane diamine, N,N-dimethyl-B-phenyl ethylamine, 1,2-dimethyl imidazole or 2-methyl imidazole.

Any suitable organo-metal compound which will act as a urethane catalyst may be used in this invention, such as cadmium, antimony, tin, cobalt, zinc, titanium, particularly organic tin compounds, etc. and mixtures thereof. Organo-tin-sulfur compounds may also be used.

The organic tin compounds used are preferably tin-(II) salts of carboxylic acids such as tin(II)-acetate, tin(II)-octoate, tin(II)-ethyl hexoate and tin(II)-laureate and the dialkyl tin salts of carboxylic acids such as dibutyl tin diacetate, dibutyl tin dilaurate, dibutyl tin maleate or dioctyl tin diacetate.

Suitable tertiary amine catalysts with hydrogen atoms which are reactive with isocyanate groups include, e.g., triethanolamine, triisopropanolamine, N-methyl-diethanolamine, N-ethyl-diethanolamine, N,N-dimethyl-ethanolamine and their reaction products with alkylene oxides such as propylene oxide and/or ethylene oxide.

Silaamines which have carbon-silicon bonds as described, e.g., in German Patent Specification No. 1,229,290 may also be used as catalysts, e.g., 2,2,4-trimethyl-2-silamorpholine or 1,3-diethylaminomethyl-tetramethyl-disiloxane.

Bases which contain nitrogen, such as tetraalkyl ammonium hydroxides, alkali metal hydroxides such as sodium hydroxide, alkali metal phenolates such as sodium phenolate or alkali metal alcoholates such as sodium methylate may also be used as catalysts. Hexahydrotriazines are also suitable catalysts.

Other representatives of catalysts which may be used according to the invention and details concerning the action of the catalysts have been described in Kunststoff-Handbuch, Volume VII, published by Vieweg and Hochtlen, Carl-Hanser-Verlag, Munich, 1966, e.g., on pages 96 to 102.

The polyurethane catalysts or activators are generally used in any catalytic amount, preferably in a quantity up to 10 percent by weight, based on the reactive mixture.

COMPONENT D

Optionally, any suitable organic compound, that will react with isocyanate radicals may be utilized in this invention. Suitable organic compounds include, but are not limited to epoxy compounds, alcohols, aldehydes, ketones, phenols, thioalcohols, organic acids, isocyanates, thioisocyanates, thiophenols, carboxylic acid halides, sulphonic acid halides, organic esters, organic ethers and thioethers, halomethyl compounds, nitriles, organic microcompounds, polyepoxy compounds and mixtures thereof. When these organic compounds are used in the reaction mixture, up to 300 parts by weight is used. This compound may be saturated, unsaturated and contain a substituted radical, e.g. halogen, etc.

Any suitable compound that contains at least one active hydrogen, preferably 2 or more active hydrogen-containing compounds, that will react with isocyanate radical may be used in this invention.

The organic compounds having reactive hydrogens are understood to be not only compounds which contain amino groups, thiol groups or carboxyl groups, but particularly also polyhydroxyl compounds.

Any suitable liquid polyol (organic polyhydroxyl compound), in particular, compounds which contain from 2 to 8 hydroxyl groups, especially those with a molecular weight of about 400 to about 6,000, e.g. polyesters, polyethers, polythioethers, polyacetals, polycarbonates or polyester amides containing at least 2, generally form 2 to 8, but preferably dihydric alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated; examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterphthalate and bisglycol terephthalate. Any suitable polyhydric alcohol may be used such as, for example, ethylene glycol; propylene-1,2 and -1,3-glycol; butylene-1,4- and -2,3-glycol; propylene-1,2- and -1,3-glycol; butylene-1,4- and -2,3-glycol; hexane-1,6-diol; octane-1,8-diol; neopentyl glycol; cyclohexanedimethenol-1(1,4-bishydroxymethyl-cyclohexane); 2-methylpropane-1,3-diol; glycerol: trimethylol propane; pentaerythritol; quinitol; mannitol and sorbitol; methyl glycoside; diethylene glycol; triethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones, such as ε-caprolactone, or hydroxycarboxylic acid such as hydroxycaproic acid, may also be used.

The polyethers with at least 2, generally from 2 to 8 and preferably 2 or 3, hydroxyl groups used according to the invention are known and may be prepared, e.g., by the polymerization of epoxides, e.g., ethylene oxide, propylene oxide, butylene oxide, tetrahydrofurane oxide, styrene oxide or epichlorohydrin, each with itself, e.g., in the presence of $BF_2$, or by addition of these epoxides, optionally as mixtures or successively, to starting components which contain reactive hydrogen atoms such as alcohols or amines, e.g., water, ethylene glycol; propylene-1,3- or -1,2-glycol; trimethylol propane; 4,4-dihydroxydiphenyl propane, aniline, ammonia, ethanolamine or ethylenediamine; sucrose polyethers such as those described, e.g., in German Auslegeschriften Nos. 1,175,358 and 1,064,938, may also be used according to the invention. It is frequently preferred to use polyethers which contain predominantly primary OH groups (up to 90% by weight, based on total OH groups contained in the polyether). Polyethers modified with vinyl polymers such as those which may be obtained by polymerizing styrene or acrylonitrites in the presence of polyethers, (U.S. Pat. Nos. 3,383,351; 3,304,273; 3,523,093 and 3,110,695; and German Pat. No. 1,152,536) and polybutadienes which contain OH groups are also suitable.

By "polythioethers" are meant, in particular, the condensation of thiodiglycol with itself and/or with other glycols, dicarboxylic acids, formaldehyde, aminocarboxylic acids or amino alcohols. The products obtained are polythiomixed ethers or polythioether ester amides, depending on the co-component.

The polyacetals used may be, for example, the compounds which may be obtained from glycols, 4,4'-dihydroxydiphenyl-methylmethane, hexanediol, and formaldehyde. Polyacetals suitable for the invention may also be prepared by the polymerization of cyclic acetals.

The polycarbonates with hydroxyl groups used may be of the kind, e.g., which may be prepared by reaction diols, e.g., propane-1, 3-diol; butane-1, 4-diol; and/or hexane-1,6-diol or diethylene glycol, triethylene glycol or tetraethylene glycol, with diarylcarbonates, e.g., diphenylcarbonates or phosgene.

The polyester amides and polyamides include, e.g., the predominantly linear condensates obtained from polyvalent saturated and unsaturated carboxylic acids or their anhydrides, any polyvalent saturated and unsaturated amino alcohols, diamines, polyamines and mixtures thereof.

Polyhydroxyl compounds which contain urethane or urea groups, modified or unmodified natural polyols, e.g., castor oil, carbohydrates and starches, may also be used. Additional products of alkylene oxides with phenol formaldehyde resins or with urea-formaldehyde resins are also suitable for the purpose of the invention.

Examples of these compounds which are to be used according to the invention have been described in High Polymers, Volume XVI, "Polyurethane, Chemistry and Technology", published by Saunders-Frisch Interscience Publishers, New York, London, Volume I, 1962, pages 32 to 42 and pages 44 to 54, and Volume II, 1964, pages 5 and 16 and pages 198 and 199; and in Kunststoff-Handbuch, Volume VII, Vieweg-Hochtlen, Carl-Hanser-Verlag, Munich, 1966 on pages 45 to 71.

Any suitable compound which contains one or more active hydrogens may be used in this invention such as alcohols, thioalcohols, phenols, thiophenols, aldehydes, carboxylic acid bromides, sulphonic acid chlorides, organic esters, ethers, thioethers, halomethyl compounds, ketones, nitriles, sulphonic acids, amines and mixtures thereof. Compounds which contain one OH group and/or at least one other hydrophilic and/or polar group which has the general formulae:

RSH, RCH$_2$CL, RCH$_2$Br, RCH$_2$I, RCN, RNO$_2$, RCOCL, RCOBr, RSO$_2$CL, RCOOH, RSO$_3$H, RCOO$^-$, RSO$_3^-$, ROR,

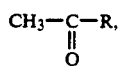

wherein R denotes a methyl, ethyl or propyl group, may be used in this invention.

Any suitable epoxy compound may be used in this invention. Suitable epoxy compounds include but are not limited to ethylene oxide, propyleneoxide, butylene oxide, tetrahydrofuran, styrene oxide, epihalohydrins and polyepoxy compounds. Polyepoxy compounds are preferred, but not limited to, a list of suitable polyepoxy compounds is found in U.S. Pat. No. 4,292,413 page 2–4 and is incorporated into this application. The polyepoxy compounds are well known in the Arts and are the preferred epoxy compound.

Compounds containing organic amphophilous compounds, preferably contain 1 to 9 carbon atoms and has a molecular weight of from 32 to about 400, which contain one DH group and/or at least one other hydrophilic and/or polar group. The other hydrophilic and/or polar group is preferably a functional group corresponding to one of the following general formulae:

RSH, RCH$_2$Cl, RCH$_2$Br, RCH$_2$I, RCN, RCOCL, RCOBr, RSO$_2$Cl, RCOOH, RSO$_3$H, RCOO—, RSO$_3$, ROR,

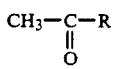

wherein R denotes a methyl, ethyl or propyl group. The organic amphilphilous compounds may contain an OH group and/or from 1 to 6 of these other groups. Examples of these compounds may be found in U.S. Pat. No. 4,153,764, column 6 and 7 and i incorporated into this application.

Suitable epoxy compounds include, but are not limited to ethylene oxide, propylene oxide, butylene oxide, tetrahydrofuran, styrene oxide, epihalohydrins, trichlorobutylene oxide, etc. A list of suitable polyepoxy compounds is found in U.S. Pat. No. 4,292,413 page 24 and is incorporated into this application.

The flame-retardant polyurethane products may be produced under any suitable physical conditions. The components may be mixed in any suitable physical condition. The components may be mixed in any suitable manner. It is preferable to mix and react components A and B first, then optionally, component D, to produce a polyurethane product. The components may be reacted at any suitable temperature, usually between ambient temperature to 160° C. Increased temperature usually increase the reaction speed. Ambient pressure is usually utilized but when one of the reactants is a gas, increased pressure is used. The components A, B and C may be mixed simultaneously to produce flame-retardant polyurethane foam with or without component D.

Other optional components may be used such as water, initiators, fillers, diluents, blowing agents, emulsifying agents, activators, foam stabilizers, modifying compounds, unsaturated polymerizable compound with free-radical initiator, flame-retardant compounds, pigments, dyes, stabilizers against aging and weathering, plasticizers, fungicidal and bacteriocidal substances, carbon powder, etc.

The proportions of the reactants and other compounds used in this invention may vary within the following ratios;

a) 10 to 100 parts by weight of component A (organic phosphorus containing compound);
b) 25 to 200 parts by weight of component B (polyisocyanate);
c) up to 10 parts by weight of component C (polyurethane catalyst);
d) up to 300 parts by weight of a compound with an active hydrogen that will react with a polyisocyanate compound;
e) up to 50% by weight of an inert liquid, boiling in the range of $-25°$ C. to 80° C.;
f) up to 20% by weight of foam stabilizer;
g) up to 20% by weight of acid boron compound;
h) up to 20% by weight of emulsifying agent;
i) up to 300% by weight of inorganic or organic particulate or pulverulent material;
j) up to 300 parts by weight of a modifying compound;
k) up to 25% by weight of phase-change material;
l) up to 5% by weight of a free-radical-initiator;
m) up to 10% by weight of water;
n) up to 75% by weight of an organic polymerizable compound percentage based on weight of the reaction mixture.

When producing foams by the process according to the invention, blowing agents may be used. The blowing agents which are suitable for this purpose are inert liquids boiling within a range of $-25°$ C. to $+80°$ C. and preferably $-15°$ C. to $+40°$ C. They are used in quantities of 0–50 percent by weight, preferably 2–30 percent by weight when needed, based on the reaction mixture. Additional blowing agents are usually not necessary because a blowing agent is produced by the reactions between the components A and B.

Suitable organic blowing agents are, e.g., acetone, ethyl acetate, methanol, ethanol, halogen-substituted alkanes such as methylene chloride, chloroform, ethylidene chloride, vinylidene chloride, monofluorotrichloromethane, chlorodifluoromethane or dichlorodifluoromethane, butane, hexane, heptane or diethyl ether. Substances which decompose at temperatures above room temperature to liberate gases such as azoisobutyric acid nitrile, may also act as blowing agents. Other examples of blowing agents and details concerning the use of blowing agents are described in Kunststoff-Handbuch, Volume VII, published by Vieweg and Hochtlen, Carl-Hanser-Verlag, Munich 1966, e.g., on pages 108 and 109, 453 to 455 and 507 to 510.

A surface-active additive (emulsifiers and foam stabilizers) may be added to the components. Any suitable surface-active additive may be used. The surface-active additive may be non-ionic, anionic or cation. Suitable surface-active additive include, but not limited to, the sodium salts of ricinoleic sulphonates or of fatty acids or salts of fatty acid with amines, e.g., oleic acid diethylamine or stearic acid diethanolamine, alkali metal or ammonium salts of sulphonic acid, e.g., dodecylbenzene sulphonic acid or dinaphthyl methane disulphonic acid, or fatty acids such as ricinoleic acid, or polymeric fatty acids and others. The foam stabilizers used are mainly water-soluble polyester siloxanes. These compounds generally have a polydimethylsiloxane group attached to a copolymer of ethylene oxide and propylene oxide. Foam stabilizers of this kind have been described in U.S. Pat. No. 3,629,308.

Solid inert fillers may be added to the components. They may be organic or inorganic substances and may be in the form of powders, hollow beads, granulate, wire, fibers, dumb bells, crystallites, spirals, rods, beads, foam particles, webs, woven fabric, ribbons, etc. Any commonly known inert filler known in the Arts may be used.

Any suitable initiator which will promote the polymerization of a solution of a vinyl monomer may be used in this invention. The controlled polymerization of the vinyl monomer in a polyol, in order to yield fully cured solids, usually required the use of an initiator. Only a catalytic amount of an initiator is needed and the amount may vary up to 1% by weight based on the vinyl monomer.

Any suitable free-radical initiator, such as organic and inorganic peroxides, azo compounds, alkali metal persulfates, ammonium persulfates and mixtures thereof, may be used. The fact that the action of organic peroxide can be modified by activators and promoters, plus their ready availability at reasonable cost, makes them preferably in this invention. Thermal and photopolymerization may be used in certain cases.

Suitable organic peroxide initiators include, but are not limited to, acetyl benzoyl peroxide, methyl ethyl ketone peroxide, cyclohexanone peroxide, cyclohexyl hydroperoxide, 2,4-dichlorobenzyl peroxide, cumene hydroperoxide, tert-butyl hypoperoxide, methyl amyl ketone peroxide, lauryl peroxide, benzoyl peroxide, tert-butyl perbenzoate, di-tert-butyl diperphthalate, and mixtures thereof.

Activators and promoters, used in conjunction with the initiators such as cobalt which, in the form of its ethyl hexanoate or naphthanate salt, is a good, general-purpose activator for use with ketone peroxides, may be added to the vinyl monomer. Concentration as low as 30 ppm of cobalt metal will activate a system.

Other activators may be added to the vinyl monomers such as tertiary dialkyl aryl amines, e.g., diethyl aniline, and aliphatic thiols, e.g., lauryl mercaptan, when acyl peroxides are used. When alkali metal or ammonium persulfates are used, ferric sulfate and cupric sulfate may be added to the unsaturated polyester resin.

Promoters used with acyl peroxide include tertiary dialkyl aryl amines such as diethyl aniline and aliphatic thiols, such as, for example, lauryl mercaptan. Concentrations used are most often in the range of up to 0.5% of active substances. Promoters usually are strong reducing agents and initiators are strong oxidizing agents.

Suitable alkali metal persulfates include potassium and sodium persulfate. Redox systems may also be utilized in this invention.

Epoxy catalyst may be used with the epoxy compounds. Suitable epoxy catalyst include amines, Lewis acids, alkali metal oxides and hydroxides and mercaptan-terminated liquid compounds. A list of these compounds may be found in U.S. Pat. No. 4,383,089 pages 5-12 and is incorporated into this Application.

Any suitable modifying or additive compound may be used in the reaction of this invention to vary properties of the product. Typical modifying compounds include polyepoxides, polysulfides, polymers, alkali sulfides, aminoplasts, phenoplasts, fatty or rosin acids, furfural-ketone resin, styrene oxide, cellulose, lignin, vegetable oil, melamine, urea, furan compounds, vinyl monomers with catalyst, vinyl polymers, aliphatic dienes, diene polymers, halogenated aliphatic and aromatic compounds, triallyl cyanurate, polyepichlorohydrin polymers, alkali metal phenols, polyester resins with catalyst, aldehydes, ketones, alkali metal silicates, aqueous alkali metal silicates, fumed silica, hydrated silica, polysilicic acid, perchloroethylene, benzoate esters, phthalate esters, polyester benzoate, water-binding agents, etc. and mixtures thereof.

Any suitable phase-change materials may be added to the components of this invention. Phase-change materials are materials that melt to store heat and freeze (solidify) to give up heat. The melting and freezing of the material takes place over a narrow temperature range, similar to ice. Heat is stored during the day and released at night when temperature drops. Suitable phase-change materials include, but are not limited to, salt hydrates, crystalline alkyl hydrocarbons (paraffin waxes), fatty acids, fatty acid esters, poly(ethylene glycol) waxed and mixtures thereof. Flame retardants may be added to change the melting and freezing points. The various phase-change materials may be mixed to obtain the desired melting and freezing points.

Any suitable flame-retardant agent may be used in this invention such as alkali metal phosphate compounds, alkaline metal earth phosphate compounds, ammonium phosphates and other salts of phosphoric acid, halogenated paraffins, organic phosphorus containing compounds, organic phosphorus and halogen containing compound and other flame-retardant agents commonly known in the Arts. Other substances such as plasticizers, dyes, stabilizers, negative catalyst, pigments, stabilizers against aging and weathering, fungicidal and bacteriocidal substances may be used in this invention. Details about methods of using these additives and their action may be found in Kunststoff-Handbuch, Volume VI; published by Vieweg and Hochtlen, Carl-Hansen-Verlag, Munich 1966, e.g. on pages 103 to 113.

Polyurethane products have many uses and these uses are well known in the Arts. The polyurethane foam produced by this invention may be used for cushioning, packaging, sound and thermal insulation, as an adhesive, as construction material, as shoe soles, as coating agent, as cavity filler, etc.

The reactive components may be mixed and sprayed in any of the well known polyurethane foaming machines to produce in-situ insulation. The components may be used in a two component system, mixed then poured in place such as in boats for flotation. The mixed components may be pumped into molds to form auto or furniture cushions, art objects, building materials, insulation, paneling, etc.

The object of the present invention is to provide a novel process of producing flame-retardant polyurethane products. Another object is to produce novel flame-retardant polyurethane products. Another object is to produce novel flame-retardant polyurethane products using the blowing agent produced by the reaction of an organic phosphorus containing compound with a polyisocyanate. Still another object is to produce flame-retardant polyurethane products that may be used for thermal insulation, structural purposes, sound proofing, shock-resistant packaging, cushions, surface coating, adhesives, casting material, putty, etc.

DESCRIPTION OF PREFERRED EMBODIMENTS

My invention will be illustrated in greater detail by the specific examples which follow, it being understood that these preferred embodiments are illustrative of, but not limited to, procedures which may be used in the production of flame-retardant polyurethane products. Parts and percentages are by weight unless otherwise indicated.

EXAMPLE 1

About 25 parts by weight of dimethyl methyl phosphonate, 20 parts by weight of polyisocyanate (PAPI 27 by DOW), 0.25 parts by weight of organic-tin catalyst (DABCO T12 by Air Products) and 0.5 parts by weight of a foam stabilizer (L 5420 by Union Carbide) are mixed. The mixture slowly expands to about 2 lbs/cu. ft. and solidifies to produce a semi-flexible flame-retardant foam.

The foam was flame tested after one week by using a ½ inch propane torch flame. The flame was held about one inch from the foam for 15 seconds. The superficial layer of the foam slowly burned and formed a char and as soon as the char formed the flame went out.

EXAMPLE 2

Example 1 is modified wherein another organic phosphorus containing compound is used in place of dimethyl methyl phosphorate and selected from the list below:
a) melamine salt of dimethyl methyl phosphonate
b) urea salt of dimethyl methyl phosphonate
c) guanidine salt of dimethyl methyl phosphonate
d) melamine salt of dimethyl hydrogen phosphite
e) diethyl ethyl phosphonate
f) tributoxyethyl phosphate
g) trimethyl phosphite
h) melamine salt of trimethyl phosphite
i) ammonium salt of dimethyl methyl phosphonate
j) sodium salt of dimethyl methyl phosphonite with silica and silicic acid
k) ammonium salt of dimethyl methyl phosphonate
l) dimethyl methyl phosphonate-phosphoric acid
m) melamine salt of dimethyl methyl phosphonate-phosphoric acid
n) dimethyl methyl phosphonate-dichloropropano-phosphate

EXAMPLE 3

Example 1 is modified wherein 5 parts by weight of a compound with 1 or more active hydrogens that will react with an isocyanate radical and selected from the list below:
a) polypropylene triol, mol. wt. 3,000, hydroxyl no. 42;
b) poly(oxyalkylene) triol, mol. wt. 3,000, hydroxyl no. 58;
c) polypropylene diol, mol. wt. 1,275, hydroxyl no. 88;
d) polypropylene diol, mol. wt. 2,000, hydroxyl no. 56;
e) wood powder;
f) sucrose polyether polyol, hydroxyl no. 380;
g) sucrose amine polyol, hydroxyl no. 350;
h) polyester polyol, hydroxyl no. 275;
i) aromatic polyester polyol, hydroxyl no. 405;
j) chlorinated polyhydropolyether, hydroxyl no. 193;
k) methyl glycoside-based polyol, hydroxyl no. 240;
l) phenol-formaldehyde resin, hydroxyl no. 140;
m) phenolyl-formaldehyde resin with furfuryl alcohol and melamine, hydroxyl no. 140;
n) urea-formaldehyde resin polyol, hydroxyl no. 120;
o) aromatic polyol, hydroxyl no. 375;
p) sorbitol-based polyol, hydroxyl no. 490;
q) polypropylene polyol with urea, hydroxyl no. 380;
r) phosphorus-containing polyol (VIRCOL-82 by MOBIL) hydroxyl no. 205;
s) ethylene oxide/propylene oxide polyol, viscosity 857, hydroxyl no. 335;
t) hydroxy terminated homopolymer of butadiene, hydroxyl no. 46.6, mol. wt. 2,800 (POLY BD R 45HT by ARCO);
u) polyester resin with catalytic amount of methyl ethyl ketone peroxide;
v) caprolactone diol, mol. wt. 2,000, hydroxyl no. 56;
w) melamine;
x) silicone compound with free hydroxyl group;
y) hydrated sodium silicate powder;
z) mixtures of the above.

EXAMPLE 4

Example 1 is modified wherein another polyisocyanate is used in place of parts by weight PAPI 27 by DOW and selected from the list below:
a) tolylene diisocyanate (TDI 180 by OLIN)
b) polymeric MDI (MONDUR MR by MOBAY)
c) hexamethylene-1,6-diisocyanate
d) methylene diphenyl isocyanate
e) tolylene-2,4-diisocyanate
f) modified polyisocyanate (MONDUR T-422 by MOBAY)

EXAMPLE 5

Example 1 is modified wherein additional components in the amount of 3 parts by weight and selected from the list below:
a) castor oil
b) glycerine
c) precipitated silica powder
d) furfural-ketone resin
e) polyester benzoate
f) sodium silicate powder
g) acetone
h) vinyl acetate polymer
i) furaldehyde
j) polysulfide polymer
k) perchloroethylene
l) phenoplast
m) aminoplast
n) polyepichlorohydrin polymer
o) polyepoxy resin
p) propylene oxide
q) styrene with catalytic amount of potassium persulfate
r) styrene oxide
s) boric acid
t) zinc borate
u) Portland cement
v) antimony trioxide
w) hydrated aluminum hydroxide
x) monoaliminum phosphate
y) 50% halogenated paraffin and 50% paraffin wax
z) mixtures of the above.

EXAMPLE 6

Example 1 is modified wherein about 3 parts by weight of a compound is added to the components and selected from the list below:
a) propylene glycol
b) ethylene glycol
c) aqueous formaldehyde
d) benzaldehyde
e) epichlorohydrin
f) furfuryl alcohol
g) furfuraldehyde
h) tetrahydrofuran oxide
i) benzoic acid
j) adipic acid
k) aminobenzoic acid
l) phenol
m) maleic anhydride
n) ethylene chlorohydrin
o) glycolic acid
p) ethanol
q) acetaldehyde
r) benzenesulphonic acid chloride
s) ethyl acetate
t) urea borate
u) magnesium ammonium phosphate
v) monocalcium phosphate
w) 50% ammonium fluoborate and 50% antimony oxide
x) phosphorus trichloride
y) phosphorus oxide
z) mixtures of the above.

EXAMPLE 7

About 20 parts by weight of dimethyl methyl phosphonate, 40 parts by weight of TDI (MONDUR TD by MOBAY) 0.25 parts by weight of tin octoate, 2.0 parts by weight of polypropylene triol(mol. wt. 3,000, hydroxyl no. 56), 0.5 parts by weight of a foam stabilizer (DOW 190) and 0.25 parts by weight of amine catalyst (DABCO R 8020 by AIR PRODUCTS) are mixed. The mixture slowly expands to about 2 lbs/cu. ft. and solidifies to form a flexible foam.

After the foam cured for 1 week it was flame tested using a propane torch with a ½" flame placed about 1" from the foam for 15 seconds. The flame did not spread and went out when the flame from the torch was removed.

EXAMPLE 8

Example 7 is modified where 50% of the dimethyl methyl phosphonate is replaced with another organic phosphorus containing compound, and selected from halogenated phosphate-phosphite compound selected from the list below:
a) 2-(((bis(2-chloroproxy)phosphine)oxy)methyl)-2-(bromomethyl)butyl(2-bromo-propyl) (2-chloropropyl) phosphate
b) 3-((bis(2-chloroethoxy)phosphino)oxy)-2-(chloromethyl)-2-methylpropylbis(2-chloroethyl)phosphate.
c) reactive product produced by reacting one molar equivalent of 1,2,3-propanetriol with about 2 molar equivalent of phosphorus trihalide
d) reactive product produced by reacting one molar equivalent of 1,2,3-propanetriol with about 2 molar equivalent of phosphorus tribromide
e) reactive product produced by reacting 20 parts by weight of dimethyl methyl phosphonate with 10 parts by weight of phosphoric acid and 5 parts by weight of epichlorohydrin
f) reactive product produced by reacting 20 parts by weight of trimethyl phosphite with 10 parts by weight of phosphoric acid and 5 parts by weight of ethyl chlorohydrin
g) reactive product produced by reacting 20 parts by weight of tributoxyethyl phosphite with 10 parts by weight of phosphoric acid and 5 parts by weight of epibromohydrin.

EXAMPLE 9

Example 7 is modified wherein the polyisocyanate is replaced with a polyisocyanate selected from the list below:
a) 50% TDI (MONDUR TD-80) and 50% MDI (MONDUR MR by MOBAY)
b) TDI (MONDUR TD by MOBAY)
c) MDI (PAPI 27 by MOBAY)
d) modified TDI (MONDUR HR by MOBAY)
e) mixture of aromatic polyisocyanates (MONDUR MRS by MOBAY)

EXAMPLE 10

Example 7 is modified wherein the triol is replaced with another polyol selected from the list below:
a) poly(oxyalkylene) triol mol. wt. 3,000, hydroxyl no. 56 (MULTRANOL 7056 by MOBAY)
b) poly(oxyalkylene) triol, mol. wt. 4,800, hydroxyl no. 35 (MULTRANOL 3900 by MOBAY)
c) primary hydroxyl-capped polyether polyol (NIAX 11-27 by UNION CARBIDE)
d) polypropylene diol, mol. wt. 3,000, hydroxyl no. 56
e) polypropylene triol, mol. wt. 1,500, hydroxyl no. 112 (FOMERZ ET-1500 by WITCO)
f) poly(oxyalkylene) triol, hydroxyl no. 58 (NIAX 16-56 by ARCO)

EXAMPLE 11

Example 7 is modified wherein additional blowing agent is added to the components and selected from the list below:
a) 2 parts by weight of water;
b) 5 parts by weight of trichloromonofluoromethane;
c) 3 parts by weight of acetone;
d) 3 parts by weight of methylene chloride
e) 3 parts by weight of vinylidene chloride;
f) 3 parts by weight of diethyl ether
g) compressed air

EXAMPLE 12

Example 7 is modified wherein about 3 parts by weight of a compound is added with the components and selected from the list below:
a) urea borate
b) propylene oxide
c) hydrated sodium silicate powder
d) urea
e) antimony trioxide powder
f) hydrated aluminum hydroxide
g) monoaluminum phosphate
h) guanidine
i) ethylenediamine
j) ethyl chlorohydrin
k) propylene oxide
l) ammonium phosphate
m) halogenated paraffins
n) glycerol o) castor oil

EXAMPLE 13

Tolylene diisocyanate is reacted with hydroxyethyl methacrylate to produce an NCO-terminated prepolymer, then 30 parts by weight of the prepolymer is mixed with 5 parts by weight of dimethyl methyl phosphonate, 0.1 parts by weight of tin octoate, 0.2 parts by weight of triethylamine and a catalytic amount of organic hydroperoxide. The mixture cures into a flame-retardant microcellular foam.

EXAMPLE 14

About 20 parts by weight of a polyepoxy resin (glycidyl ether of dihydric phenol), 5 parts by weight of melamine salt of dimethyl methyl phosphonate, 0.1 parts by weight of tin octoate, 0.5 parts by weight of a silicone foam stabilizer (L5420 by UNION CARBIDE), 0.5 parts by weight of an amine urethane catalyst (DABCO R8020) by AIR PRODUCTS) and 20 parts by weight of MDI (MONDUR MR by MOBAY) are mixed. The mixture slowly expands to produce a rigid foam of about 2-3 lbs./cu. ft. The foam was cured for one week then flame tested with a propane torch having a ½" flame and held about 1" from the foam for 15 seconds. The flame did not spread and the flame went out when the torch was removed.

EXAMPLE 15

Example 14 is modified wherein the polyepoxy resin is a phenol-formaldehyde resin containing epoxide radicals.

EXAMPLE 16

Example 14 is modified wherein 3 parts by weight of polypropylene triol (POLY G 32-56 by OLIN) is added with the polyepoxy resin.

EXAMPLE 17

About 30 parts by weight of polyester resin (boat resin), 5 parts by weight diethyl ethyl phosphonate, 20 parts by weight of MDI (PAPI-27 by DOW), 0.5 parts by weight of a silicone foam stabilizer (DOW 193), 0.1 parts by weight of tin octoate, a catalytic amount of methyl ethyl ketone peroxide and 10 parts by weight of sucrose amine polyol, viscosity 30,000, hydroxyl no. 470 are mixed. The mixture slowly expands to produce a rigid foam of about 2-3 lbs./cu. ft.

The foam was cured for one week then flame tested with a propane torch with a ½" flame held about 1" from the foam for 15 seconds. The flame did not spread and went out after the torch was removed.

EXAMPLE 18

About 5 parts by weight of dimethyl methyl phosphonate, 25 parts by weight of polymeric MDI (MONDUR MR by MOBAY) and 0.1 parts by weight of tin octoate are mixed then poured into a collapsible tube and the air is removed. The mixture foams and the gas escapes and produces a liquid prepolymer. The prepolymer is then poured into a paper plate and slowly expands. The prepolymer is expanded and cured by the moisture in the air thereby producing a flame-retardant polyurethane foam.

After one week the foam was tested using a ½" propane torch which was applied to the foam at a distance of 1" for 15 seconds. The foam charred and the flame did not spread but went out when the torch was removed.

EXAMPLE 19

Comparison studies were done wherein 20 parts by weight of sucrose amine polyol, hydroxyl no. 375, was mixed with 20 parts by weight of polymeric MDI (PAPI 27 by DOW) and 0.1 parts by weight of tin octoate was mixed and a solid polyurethane product was produced.

About 5 parts by weight of dimethyl methyl phosphonate was added to 20 parts by weight of the sucrose amine polyol polymeric MDI and 0.1 parts by weight of tin octoate and the mixture expanded to produce a foamed polyurethane product of about 2-3 lbs./cu. ft.

EXAMPLE 20

About 50 parts by weight of dimethyl methyl phosphonate 0.1 parts by weight of tin octoate and 30 parts by weight of polymeric MDI (MONDUR MR by MOBAY) are mixed. The component reacts and foams but remains a liquid flame-retardant polyurethane prepolymer and the gaseous compound is allowed to escape.

EXAMPLE 21

Example 20 is modified wherein an additional step is taken wherein a compound that has active hydrogens that will react with isocyanate radical, 0.1 parts by weight of tin octoate, are added to the prepolymers and selected from the list below thereby producing a foamed product:
a) 2 parts by weight of water
b) 4 parts by weight of propylene glycol
c) 4 parts by weight of glycerol
d) 10 parts by weight of castor oil
e) 10 parts by weight of amine sucrose polyol, OH no. 350
f) 10 parts by weight of polypropylene diol, OH no. 88, mol. wt. 1,275
g) 5 parts by weight of epichlorohydrin
h) 15 parts by weight of polyepoxy resin
i) 15 parts by weight of polypropylene triol, hydroxyl no. 28
j) 15 parts by weight of polyester boat resin and 0.1 parts by weight of methyl ethyl ketone peroxide.

EXAMPLE 22

About 15 parts by weight of dimethyl methyl phosphonate, 10 parts by weight of polymeric MDI and 0.25 parts by weight of foam stabilizer (L5420 by DOW) are mixed. The mixture slowly rises and solidifies in about 2-3 minutes thereby producing a flexible flame-retardant polyurethane foam.

This foam was flame tested with a propane torch with a ½" flame held about 1" from the foam for 15 seconds. The flame did not spread and went out when the torch was removed.

EXAMPLE 23

Example 22 is modified wherein 0.1 parts by weight of tin octoate is added to the components.

EXAMPLE 24

20 parts by weight of dimethyl methyl phosphonate are mixed with 10 parts by weight of phosphoric acid and reacted, then 15 parts by weight of polymeric MDI, 0.3 parts by weight of a foam stabilizer (L5420 by UNION CARBIDE) and 0.1 parts by weight of tin octoate are mixed. The mixture slowly expands and at the end of expansion solidifies thereby producing a flame-retardant polyurethane foam.

After this foam had cured for one week it was flame tested by using a propane torch with a ½" flame. The flame was placed about 1" from the foam and left for 15 seconds. The foam charred and the flame did not spread and went out when the torch was removed.

EXAMPLE 25

Example 24 is modified wherein 6 parts by weight of melamine is added and reacted with the reacted dimethyl methyl phosphonate and phosphoric to form a salt then mixed with the other components to produce a flame-retardant polyurethane foam.

EXAMPLE 26

Example 24 is modified wherein 6 parts by weight of epichlorohydrin is mixed with the reacted dimethyl methyl phosphonate and phosphoric acid and reacted to form a halogenated organic phosphate-phosphite compound then mixed and reacted with the other components to produce a flame-retardant polyurethane foam.

EXAMPLE 27

Example 24 is modified wherein the reacted product of dimethyl methyl phosphonate and phosphoric acid is reacted with 6 parts by weight of a compound selected from the list below:
a) epichlorohydrin
b) propylene oxide
c) chlorohydrin
d) bromohydrin
e) ethylene oxide
f) butylene oxide
g) ethylene glycol
h) propylene glycol
i) ethylene diamine
j) ethylene amine
k) ethyl alcohol
l) epibromohydrin
m) urea
n) guanidine
o) dicyandeamide
p) ammonia
q) glycerol
r) trimethylopropane
s) melamine
t) ethylene amine
u) polyepichlorohydrin
v) polyepibromohydrin
w) dicyandiamide
x) boric acid salt of ethylenediamine
y) furfural
z) furfurol

EXAMPLE 28

Example 24 is modified wherein another phosphorus acid compound is used in place of phosphoric acid and selected from the list below:
a) polyphosphoric acid
b) phosphinic acid
c) phosphenous acid
d) phosphinous acid
e) phosphine oxide
f) hydrogen containing salt of phosphoric acid
g) hypophosphorus acid

EXAMPLE 28

Example 24 is modified wherein another organic phosphorus containing compound is used in place of dimethyl methyl phosphonate and selected from the list below:
a) diethyl ethyl phosphonate
b) dimethyl phosphite
c) tris(2-chloroethyl) phosphite
d) tributoxyethyl phosphate
e) trimethyl phosphite Although specific materials and conditions were set forth in the above examples, these were merely illustrative of preferred embodiments of my invention. Various other compositions, such as the typical materials listed above, may be used where suitable. The reactive mixtures and products of my invention may have other agents added thereto to enhance or otherwise modify the reaction and products.

Other modifications of my invention will occur to those skilled in the Art upon reading my disclosure. These are intended to be included within the scope of my invention, as defined in the appended claims.

I claim:

1. A flame retardant foamed product consisting of the reaction product of the following components:
   A. An organic phosphorus containing compound selected from the group consisting of dialkyl phosphites, trialkyl phosphites, trialkyl phosphates, dealkyl alkylphosphonates, and mixtures thereof;
   B. polyisocyanate;
   C. optionally, a polyurethane catalyst, and
   D. optionally, a foam stabilizer.

2. A process for producing flame-retardant foamed products consisting of mixing and reacting the following components:
   A. An organic phosphorus containing compound selected from the group consisting of dialkyl phosphites, trialkyl phosphites, trialkyl phosphates, dialkyl alkylphosphonates, and mixtures thereof;
   B. polyisocyanate;
   C. optionally, a polyurethane catalyst;
   D. optionally, a foam stabilizer.

3. The process according to claim 2 wherein 10 to 100 parts by weight of Component (A), 25 to 200 parts by weight of component (B), up to 10 percent by weight of component (C), and up to 20 percent by weight of component (D), are mixed and reacted, percentage based on the weight of the reactants.

4. The foamed product according to claim 1 wherein the polyurethane catalyst is an organic metal compound.

5. The process of claim 2 wherein an inorganic or organic particulate or pulverulent material is included in the reaction mixture.

6. The process of claim 2 wherein 25 percent by weight of phase-change material that melts to store heat and solidifies to give off heat are added to the reaction mixture.

7. The process of claim 2 wherein up to 75 percent by weight of an unsaturated polymerable organic compound and a catalytic amount of a free-radical initiator is added to the reaction mixture.

8. The product produced by the process of claim 2.

9. A flame-retardant foamed product consisting of the reaction product of the following components:
   A. a salt of an organic phosphorus containing compound selected from the group consisting of a salt of a dialkyl phosphite, a salt of a trialkyl phosphite, a salt of a trialkyl phosphate, salt of a dialkyl alkylphosphonate, and mixtures thereof;

B. organic polyisocyanate;
C. optionally, a polyurethane catalyst;
D. optionally, a foam stabilizer.

10. The flame-retardant foamed product of claim 1 wherein phase-change materials that melt to store heat and solidifies to give off heat are added to the reaction mixture.

11. A flame retardant foamed product consisting of the reaction product of the following components:

a. An organic phosphorus containing compound selected from the group consisting of dialkyl phosphites, trialkyl phosphites, trialkyl phosphates, dialkyl alkylphosphonates, and mixtures thereof;
b. compound containing one or more isocyanate radicals and one or more unsaturated bonds which will polymerize;
c. catalytic amount of a free-radical initiator;
d. optionally, a polyurethane catalyst; and
e. optionally, a foam stabilizer.

12. The flame retardant foam product of claim 1 wherein an inert liquid, boiling in the range of 25° C. to 80° C., is added to components A or B.

* * * * *